(12) United States Patent
Sasano et al.

(10) Patent No.: US 8,285,888 B2
(45) Date of Patent: Oct. 9, 2012

(54) COMMUNICATION SYSTEM, COMMUNICATION CONTROL APPARATUS, AND COMMUNICATION METHOD

(75) Inventors: Jun Sasano, Tokyo-to (JP); Tomohide Oka, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/026,542

(22) Filed: Feb. 14, 2011

(65) Prior Publication Data
US 2011/0202694 A1    Aug. 18, 2011

Related U.S. Application Data

(60) Provisional application No. 61/305,399, filed on Feb. 17, 2010, provisional application No. 61/350,201, filed on Jun. 1, 2010.

(51) Int. Cl.
*G06F 3/00*    (2006.01)
(52) U.S. Cl. .......................................... 710/21; 358/1.14
(58) Field of Classification Search ...................... 710/21
See application file for complete search history.

(56) References Cited

U.S. PATENT DOCUMENTS

| | | | | |
|---|---|---|---|---|
| 6,061,146 A * | 5/2000 | Mori | .............................. | 358/403 |
| 7,466,432 B2 * | 12/2008 | Mitani | ........................... | 358/1.1 |
| 2006/0047765 A1 * | 3/2006 | Mizoi et al. | ................... | 709/206 |
| 2008/0100861 A1 * | 5/2008 | Sakura | ......................... | 358/1.15 |
| 2010/0007903 A1 * | 1/2010 | Mitani | ........................... | 358/1.9 |

FOREIGN PATENT DOCUMENTS
JP        2003046943        2/2003
* cited by examiner

*Primary Examiner* — Elias Mamo
(74) *Attorney, Agent, or Firm* — Turocy & Watson, LLP

(57) ABSTRACT

According to one embodiment, a communication system includes a first communication control apparatus and a second communication control apparatus. The first communication control apparatus includes an acquiring unit, a generating unit, and a transferring unit. The second communication control apparatus includes a receiving unit and a processing unit. The acquiring unit acquires a computer file. The generating unit generates transfer information including the computer file and added information indicating a content of processing designated by a user of the first communication control apparatus from among plural contents of processing relating to the computer file. The transferring unit transfers the transfer information to the second communication control apparatus. The receiving unit receives the transfer information. The processing unit performs processing on the computer file included in the transfer information in accordance with the content of processing indicated by the added information included in the transfer information.

9 Claims, 10 Drawing Sheets

| Box number | Address | Determination mode |
|---|---|---|
| 1 | × × × × × × × × | First |
| 2 | ○○○○○○○○ | Fourth |
| 3 | △△△△△△△△ | Second |
| 4 | □□□□□□□ | — |
| 5 | ☆☆☆☆☆☆☆☆ | Third |
| ⋮ | ⋮ | ⋮ |

F I G. 2

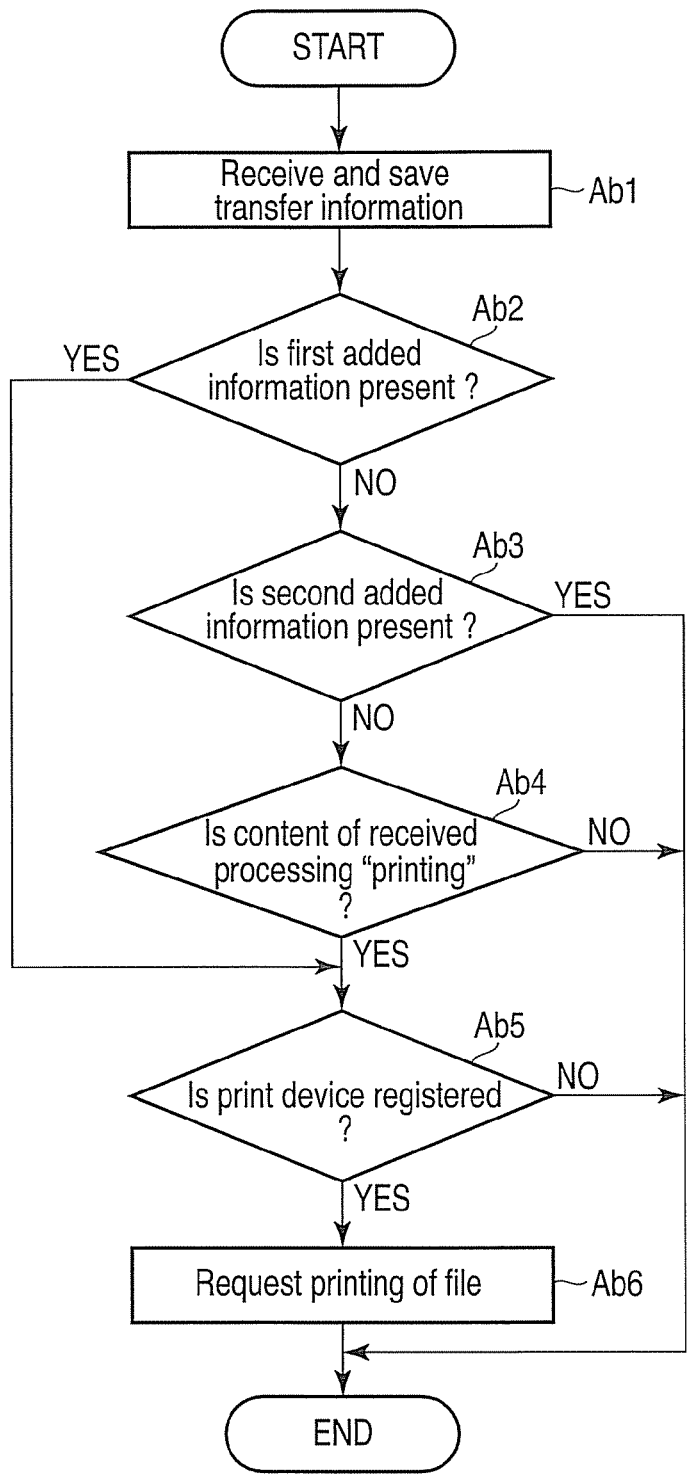
F I G. 4

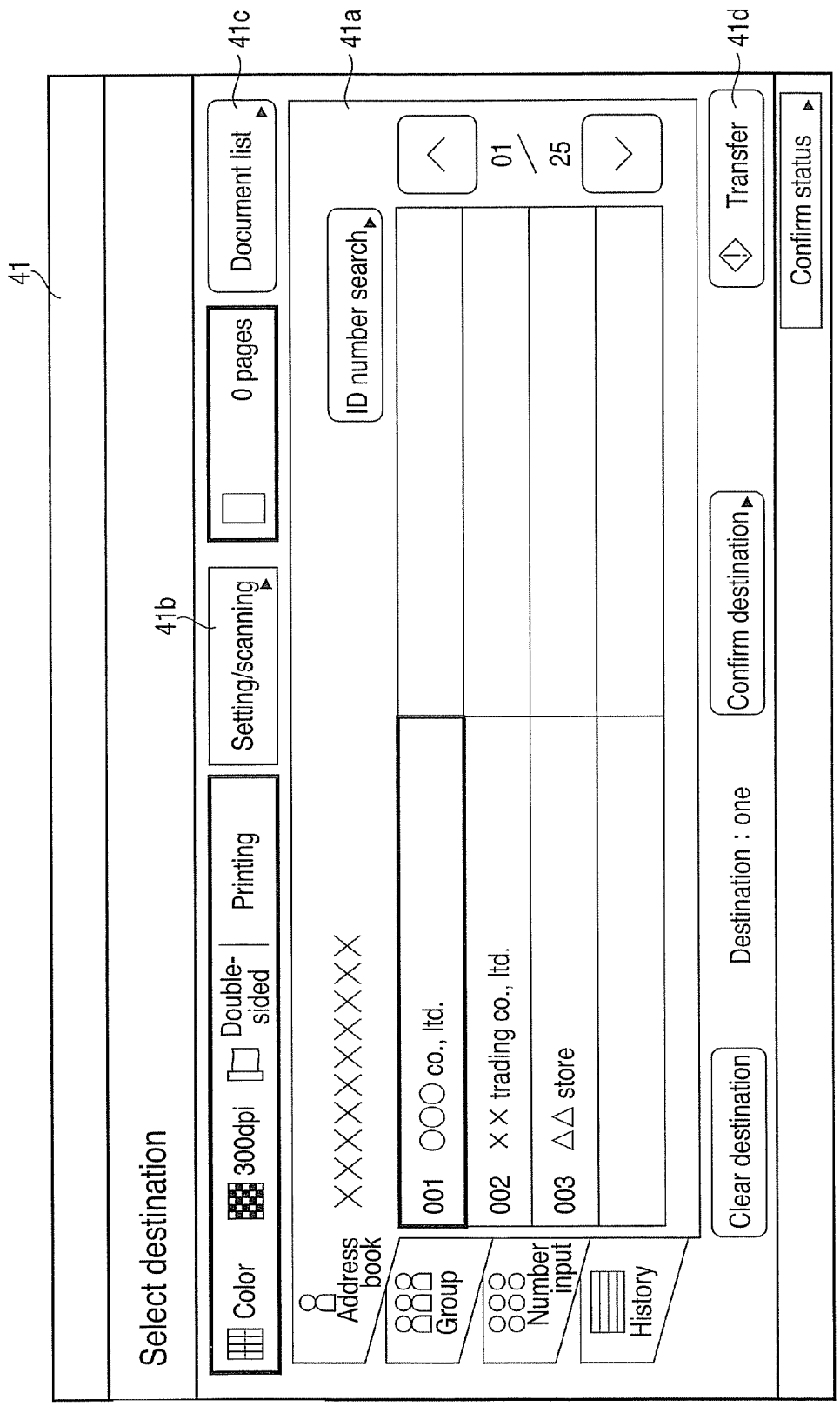
F I G. 6

Confirm sent documents

Sent document list

| | File name | Page | Size | Date | Printing | Saving |
|---|---|---|---|---|---|---|
| | doc1001010001-xxxxx1 | 1 | 1KB | 01/01 00:01 | ☐ | ☑ |
| | doc1001010002-xxxxx2 | 1 | 1KB | 01/01 00:02 | ☑ | ☑ |
| | doc1001010003-xxxxx3 | 1 | 1KB | 01/01 00:03 | ☑ | ☐ |

Total : 3 pages / 3 KB

< 01 / 01 >

61a, 61b, 61c

Delete    Close    Confirm status

F I G. 8

//COMMUNICATION SYSTEM, COMMUNICATION CONTROL APPARATUS, AND COMMUNICATION METHOD

CROSS-REFERENCE TO RELATED APPLICATIONS

This application is based upon and claims the benefit of priority from U.S. provisional applications 61/305,399, filed on Feb. 17, 2010; and 61/350,201, filed on Jun. 1, 2010 the entire contents of both of which are incorporated herein by reference.

FIELD

Embodiments described herein relate generally to a communication system, a communication control apparatus, and a communication method.

BACKGROUND

In transferring a file via a next generation network (NGN), for example, a processing method of the file is determined based only on conditions of an apparatus which receives the file. That is, for example, if setting is made such that the file is saved in the apparatus which receives the file, the file is stored in a memory or the like.

DESCRIPTION OF THE DRAWINGS

FIG. 2 is a diagram showing an example of setting data stored in a storing device in FIG. 1 in a first operation example.

FIG. 4 is a flow chart of processing by the controller in FIG. 1 in the first operation example.

FIG. 6 is a diagram showing an example of a UI screen displayed by an MFP in FIG. 1.

FIG. 8 is a diagram showing an example of the UI screen displayed by the MFP in FIG. 1.

DETAILED DESCRIPTION

In general, according to one embodiment, a communication system includes a first communication control apparatus and a second communication control apparatus. The first communication control apparatus is provided with an acquiring unit, a generating unit, and a transferring unit. The second communication control apparatus is provided with a receiving unit and a processing unit. The acquiring unit acquires a computer file. The generating unit generates transfer information including the computer file and added information indicating a content of processing designated by a user of the first communication control apparatus from among plural contents of processing relating to the computer file. The transferring unit transfers the transfer information to the second communication control apparatus. The receiving unit receives the transfer information transferred by the transferring unit. The processing unit performs processing on the computer file included in the transfer information received by the receiving unit in accordance with the content of processing indicated by the added information included in the transfer information received by the receiving unit.

Hereinafter, description will be made of the communication control apparatus according to an embodiment with reference to the drawings. In addition, the communication control apparatus is also called a network adapter or simply called an adapter. Hereinafter, it will be referred to as an adapter.

Figure 1:
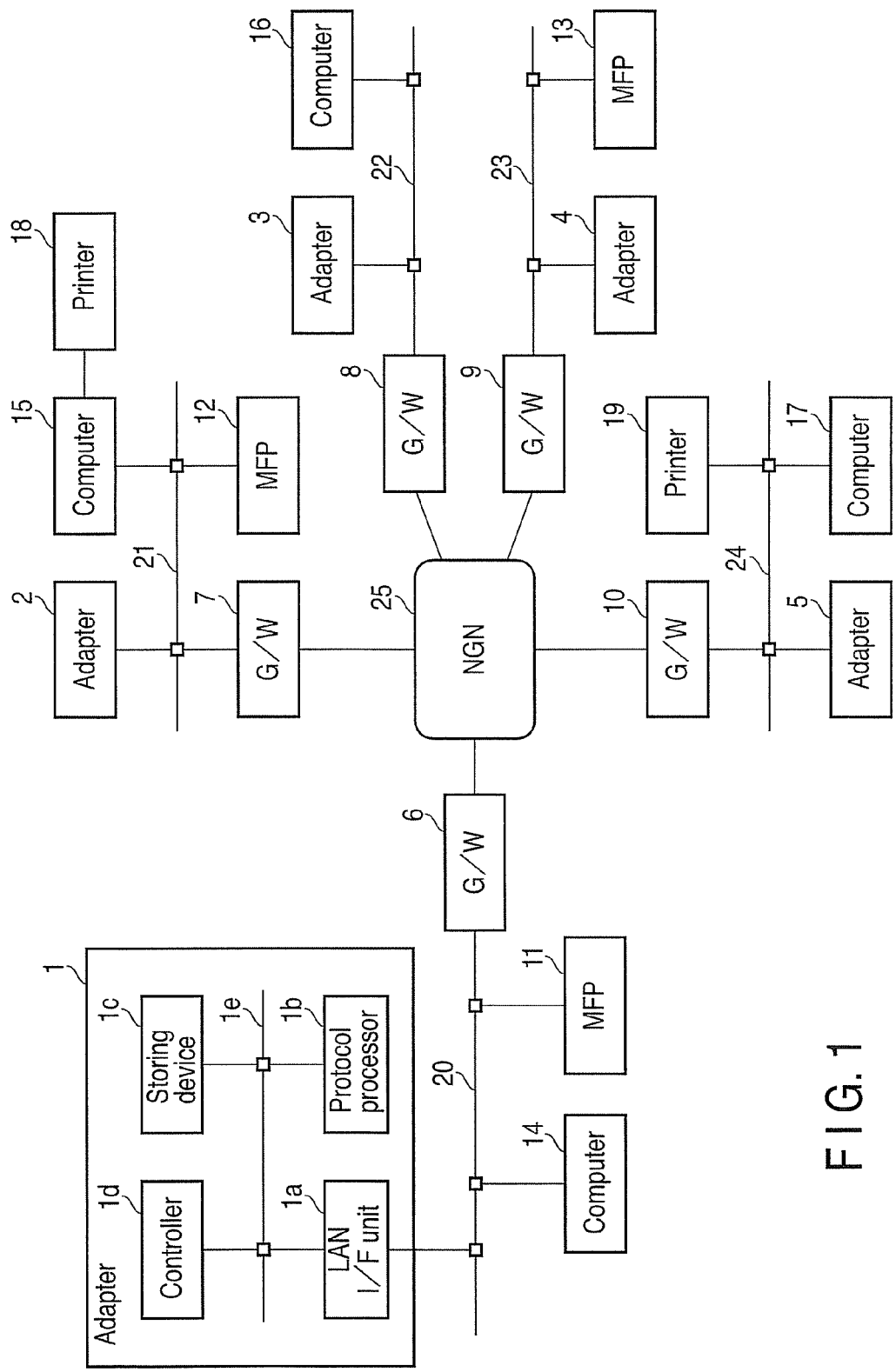
FIG. 1 is a block diagram showing a configuration of an adapter and a configuration of a communication system including this adapter according to an embodiment.

FIG. 1 is a block diagram showing a configuration of an adapter 1 and a configuration of a communication system including this adapter 1 according to this embodiment.

The communication system shown in FIG. 1 includes adapters 1, 2, 3, 4, and 5, gateways (hereinafter, referred to as G/W) 6, 7, 8, 9, and 10, multi function peripherals (hereinafter, referred to as MFP) 11, 12, and 13, computers 14, 15, 16, and 17, printers 18 and 19, LANs 20, 21, 22, 23, and 24, and NGN 25.

The adapter 1, the G/W 6, the MFP 11, and the computer 14 are connected to the LAN 20. The adapter 1 performs processing that allows the MFP 11 and the computer 14 to communicate with each other via the NGN 25.

The adapter 2, the G/W 7, the MFP 12, and the computer 15 are connected to the LAN 21. The adapter 2 performs processing that allows the MFP 12 and the computer 15 to communicate with each other via the NGN 25. The printer 18 is connected to the computer 15.

The adapter 3, the G/W 8, and the computer 16 are connected to the LAN 22. The adapter 3 performs processing that allows the computer 16 to communicate via the NGN 25.

The adapter 4, the G/W 9, and the MFP 13 are connected to the LAN 23. The adapter 4 performs processing that allows the MFP 13 to communicate via the NGN 25.

The adapter 5, the G/W 10, the computer 17, and the printer 19 are connected to the LAN 24. The adapter 5 performs processing that allows the computer 17 to communicate via the NGN 25.

The G/Ws 6, 7, 8, 9, and 10 are connected to the NGN 25 in addition to the LANs 20, 21, 22, 23, and 24. The G/Ws 6, 7, 8, 9, and 10 perform various kinds of known processing to match the differences in various conditions between the LANs 20, 21, 22, 23, and 24 and the NGN 25 and make it possible for the adapter 1 to communicate via the NGN 25.

The MFPs 11, 12, and 13 and the computers 14, 15, 16, and 17 function as terminals which acquire or process a computer file (hereinafter, referred to as a file) transferred via the NGN 25 by the adapters 1, 2, 3, 4, and 5. Each of the MFPs 11, 12, and 13 is provided with a print device installed therein and functions as a printer which prints an image in response to the request from the adapters 1, 2, 3, 4, and 5.

The printer 18 prints an image in response to the request from the computer 15.

The printer 19 prints an image in response to the request from the computer 17 and the adapter 5.

In the NGN 25, an audio mode, a video mode, and an application mode can be selectively used. The audio mode is a mode for performing an audio communication. The video mode is a mode for performing a video communication. The application mode is a mode for delivering arbitrary digital data at a high speed.

The adapter 1 includes a LAN interface (hereinafter, referred to as I/F) 1a, a protocol processor 1b, a storing device 1c, and a controller 1d. These parts are connected to a bus 1e.

The I/F 1a performs various kinds of known processing for exchanging data with the G/W 2, the MFP 11 and the computer 14 via the LAN 20.

The protocol processor 1b performs processing for executing protocol (RFC 3261, for example) defined for the communication in the NGN 25.

The storing device 1c stores various kinds of data. A known device such as a semiconductor memory, a hard disk drive, or the like can be arbitrarily applied to the storing device 1c.

The controller 1d controls the respective parts of the adapter 1 as will be described later.

Each of the adapters 2, 3, 4, and 5 may have the same configuration as that of the adapter 1 or a different configuration from that of the adapter 1.

First Operation Example

Next, a first operation of the adapter 1 will be described.

The storing device 1c stores setting data shown in FIG. 2, for example. The setting data represents information set for the data box which is logically constituted using the storing device 1c. The setting data includes plural data records describing various kinds of information such as a box number, an address, and a determination mode in association with each other. The box number is a number for identifying a data box. The address is an address of a transfer destination of the file saved in the data box. The determination mode is a mode for determining a content of processing at the transfer destination of the file saved in the data box.

Figure 3:
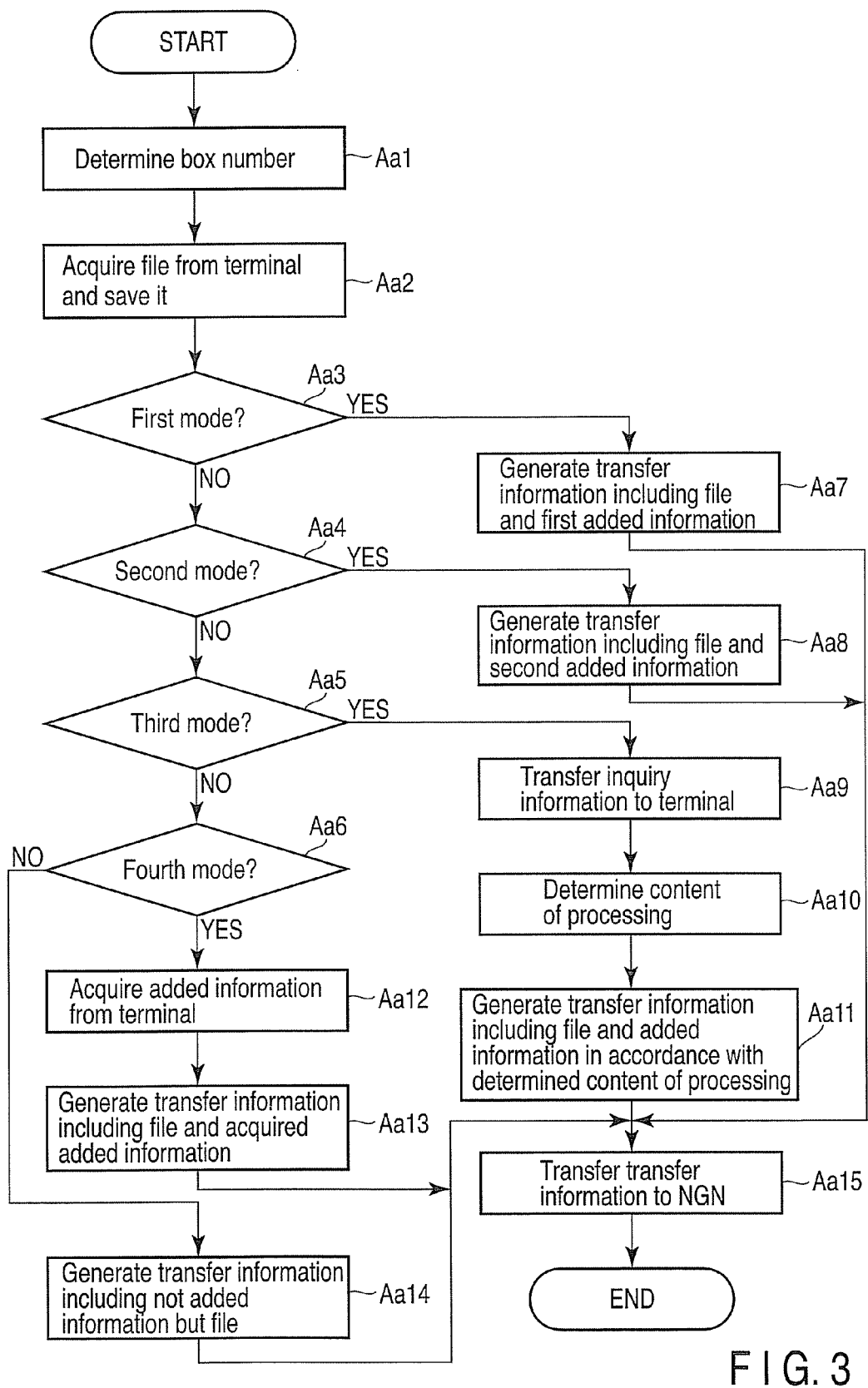
FIG. 3 is a flow chart of processing by a controller in FIG. 1 in the first operation example.

When the MFP 11 or the computer 14 transfers the data (hereinafter, referred to as a file) via the NGN 25 using an application mode, a request of transferring the data is given from the MFP 11 or the computer 14 to the adapter 1. The adapter 1 receives this request and then causes the controller 1d to start the processing shown in FIG. 3. The MFP 11 or the computer 14 which requests the transfer of the file is referred to as a transmission terminal in the following description.

In Act Aa1, the controller 1d determines the box number. Specifically, for example, the terminal receives the designation of a user relating to a transfer destination and notifies the adapter 1 of the box number corresponding to the transfer destination. Then, the controller 1d determines the box number based on this notification.

In Act Aa2, the controller 1d acquires the file from the terminal and causes the storing device 1c to store the file in association with the box number determined in Act Aa1.

In Acts Aa3 to Aa6, the controller 1d determines which one of first to fourth modes the determination mode of the content of processing in the transfer destination corresponds to. Specifically, the controller 1d refers to the determination mode described in the setting data in association with the box number determined in Act Aa1.

The first mode is a mode for always determining that the content of processing is "printing". In the first mode, the controller 1d proceeds from Act Aa3 to Act Aa7. In Act Aa7, the controller 1d generates transfer information including first added information and the file stored in the storing device 1c in Act Aa2. The first added information is information with which the printing of the file is requested to the transfer destination. Thereafter, the controller 1d proceeds to Act Aa15.

The second mode is a mode for always determining that the content of processing is "saving". In the second mode, the controller 1d proceeds from Act Aa4 to Act Aa8. In Act Aa8, the controller 1d generates transfer information including second added information and the file stored in the storing device 1c in Act Aa2. The second added information is information with which the saving of the file is requested to the transfer destination. Thereafter, the controller 1d proceeds to Act Aa15.

The third mode is a mode for determining the content of processing in accordance with a user's instruction after inquiring of the user about the content of processing every time. In the third mode, the controller 1d proceeds from Act Aa5 to Act Aa9. In Act Aa9, the controller 1d transfers inquiry information for encouraging the user of the terminal to designate the content of processing from the I/F 1a to the terminal. The inquiry information is a hypertext markup language (HTML) file showing a user interface screen for the content of processing if the terminal has a browser function, for example. The terminal receives the inquiry information, then inputs the user's designation regarding the content of processing, and notifies the adapter 1 of the user's designation. In Act Aa10, the controller 1d determines the content of processing for the file based on the above notification from the terminal. In Act Aa11, the controller 1d generates transfer information including the file stored in the storing device 1c in Act Aa2 and added information (first or second added information) in accordance with the content of processing determined in Act Aa10. Thereafter, the controller 1d proceeds to Act Aa15.

The fourth mode is a mode for determining in the terminal the content of processing in accordance with the setting. In the fourth mode, the controller 1d proceeds from Act Aa6 to Act Aa12. In Act Aa12, the controller 1d acquires added information (first or second added information) representing the content of processing from the terminal via the I/F 1a. In Act Aa13, the controller 1d generates transfer information including the file stored in the storing device 1c in Act Aa2 and the added information acquired in Act Aa12. Thereafter, the controller 1d proceeds to Act Aa15.

If the determination mode is not any one of the first to fourth modes, the controller 1d proceeds from Act Aa6 to Act Aa14. In Act Aa14, the controller 1d generates transfer information including not the added information but the file stored in the storing device 1c in Act Aa2. Thereafter, the controller 1d proceeds to Act Aa15.

In Act Aa15, the controller 1d transfers to the NGN 25 the transfer information generated in any one of the Act Aa7, Act Aa8, Act Aa11, Act Aa13, and Act Aa14. Specifically, the controller 1d instructs the protocol processor 1b to transfer the transfer information to the address described in the setting data in association with the box number determined in Act Aa1. The protocol processor 1b receives this instruction and then transfers the transfer information to the above address in accordance with the protocol such as RFC3261. At this time, the transfer information is transferred to the NGN 25 via the I/F 1a, the LAN 20, and the G/W 6.

The transfer information transferred to the NGN 25 by one of the adapters 2, 3, 4, and 5 or another adapter while the adapter 1 is set as a transfer destination is given to the adapter 1 via the G/W 6 and the LAN 20. In such a case, the controller 1d of the adapter 1 executes the processing shown in FIG. 4.

In Act Ab1, the controller 1d receives the transfer information via the I/F 1a and saves the transfer information in the storing device 1c.

In Act Ab2, the controller 1d confirms whether or not the transfer information includes the first added information. If the transfer information does not include the first added information, the controller 1d proceeds from Act Ab2 to Act Ab3.

In Act Ab3, the controller 1d confirms whether or not the transfer information includes the second added information.

If the transfer information does not include the second added information, the controller 1d proceeds from Act Ab3 to Act Ab4.

In Act Ab4, the controller 1d confirms whether or not the content of received processing is "printing". The content of received processing is a content of processing for the file received by the adapter 1, and the user of the adapter 1 presets one of "printing" and "saving". The information representing the content of received processing is then stored in the storing device 1c.

Incidentally, the controller 1d proceeds to Act Ab5 from Act Ab2 if the transfer information includes the first added information or from Act Ab4 if the content of received processing is "printing". In Act Ab5, the controller 1d confirms whether or not a print device for printing the file included in the transfer information is registered. Here, the user of the adapter 1 accesses the adapter 1 using a user interface of the MFP 11 or the computer 14 and registers in advance in the adapter 1 the print device for printing the file included in the transfer information. The controller 1d stores the information relating to the print device registered in such a manner in the storing device 1c in advance, and performs the above confirmation by referring to this information. The above print device may be the MFP 11, for example. In addition, if the adapter 2 has the same configuration as that of the adapter 1, the MFP 12 may be the print device to be registered in the adapter 2. If the adapter 5 has the same configuration as that of the adapter 1, the printer 19 may be the print device to be registered in the adapter 5. If the adapter 3 has the same configuration as that of the adapter 1, no print device is registered in the adapter 3. It is a matter of course that even if there is a device which can be registered as a print device, the device is not registered in the adapter as the print device in some cases.

If the print device is registered, the controller 1d proceeds from Act Ab5 to Act Ab6. In Act Ab6, the controller 1d requests the printing of the file included in the transfer information saved in the storing device 1c in Act Ab1 to the above registered print device. Thereafter, the controller 1d completes the processing shown in FIG. 4. The controller 1d may delete the transfer information including the file from the storing device 1c after the completion of the printing of the file in response to the request in Act Ab6.

On the other hand, the controller 1d completes the processing shown in FIG. 4 without performing Act Ab6 from Act Ab3 if the transfer information does not include the first added information, from Act Ab4 if the content of received processing is not "printing", or from Act Ab5 if the print device is not registered.

The controller 1d outputs the file saved in the storing device 1c to the MFP 11 and the computer 14 in response to the request from the MFP 11 or the computer 14.

If the transfer information including the first added information is received in the above manner, the file included in the transfer information is printed regardless of the content of received processing. On the other hand, if the transfer information including the second added information is received, the file included in the transfer information is not printed but saved in the storing device 1c regardless of the content of received processing. In such a manner, it is possible to control by the transfer source the content of processing at the transfer destination of the file.

Moreover, according to this embodiment, the content of processing for the file is selected in accordance with the setting of the transfer destination if the transfer source does not cause the transfer information to include any of first and second added information. Accordingly, a configuration is also possible in which the content of processing at the transfer destination is not controlled by the transfer source.

Furthermore, since it is possible to selectively use plural modes as a determination mode of the content of processing, it is possible to flexibly operate so as to meet the user needs.

Second Operation Example

Next, a second operation example of the adapter 1 will be described.

The storing device 1c stores address book data. This address book data includes plural data records describing an identification number, a name, and an address in association with each other. The identification number is a number for identifying each data record. The name is information for identifying a name of the destination by an operator of the terminal. The address is an address of the transfer destination of the file.

Figure 5:
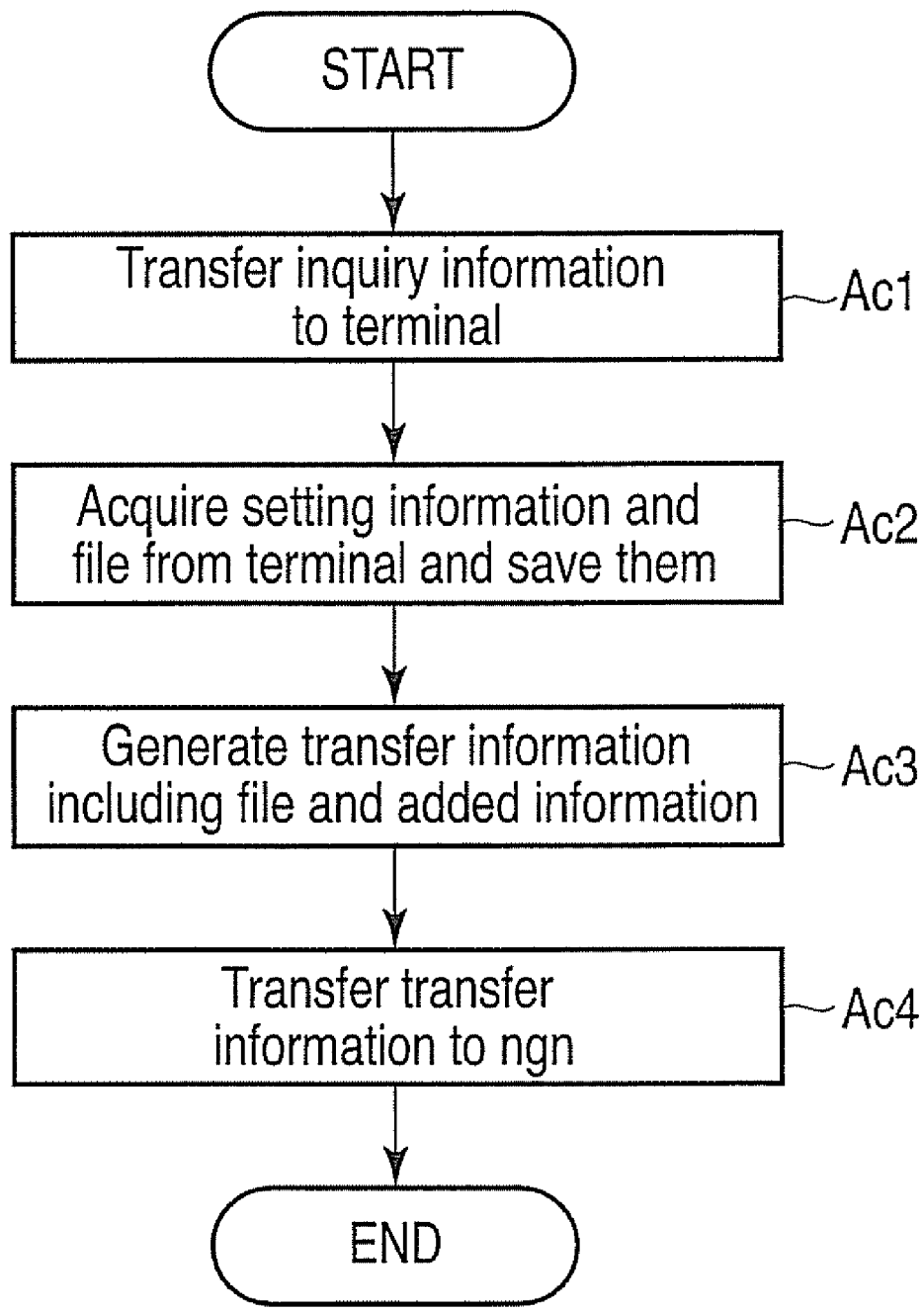
FIG. 5 is a flow chart of processing by the controller in FIG. 1 in a second operation example.

When the MFP 11 or the computer 14 transfers the file via the NGN 25 using an application mode, the MFP 11 or the computer 14 accesses the adapter 1. The controller 1d of the adapter 1 receives such an access and starts the processing shown in FIG. 5.

In Act Ac1, the controller 1d transfers inquiry information for encouraging the user of the terminal to designate the content of processing from the I/F 1a to the terminal. The inquiry information is an HTML file showing a user interface (UI) screen for the content of processing if the terminal has a browser function, for example.

FIG. 6 is a diagram showing an example of a UI screen 41 displayed by the MFP 11 in accordance with the inquiry information.

The UI screen 41 includes an address book region 41a and buttons 41b, 41c, and 41d.

The address book region 41a displays a list including the identification number and the name described in the address book data stored in the storing device 1c.

The button 41b is for inputting a request for displaying a UI screen for scanning.

The button 41c is for inputting a request for displaying a UI screen for checking a file.

The button 41d is for inputting a request for transferring a file.

The MFP 11 adds to the transfer destination an address in association with a designated identification number and a name at the address book data or deletes the address in the transfer destination in response to an operation of an operator designating the identification number and the name displayed in the address book region 41a. It is also possible to add the address to the transfer destination or delete the address in the transfer destination in response to an operation of the operator directly inputting the address of the transfer destination via an operation panel of the MFP 11 or an operation of the operator selecting one of the addresses included in transferring and receiving history data. The address book data may be stored in a built-in memory of the MFP 11.

The MFP 11 displays the UI screen for scanning in response to the operation of the operator pressing the button 41b.

Figure 7:
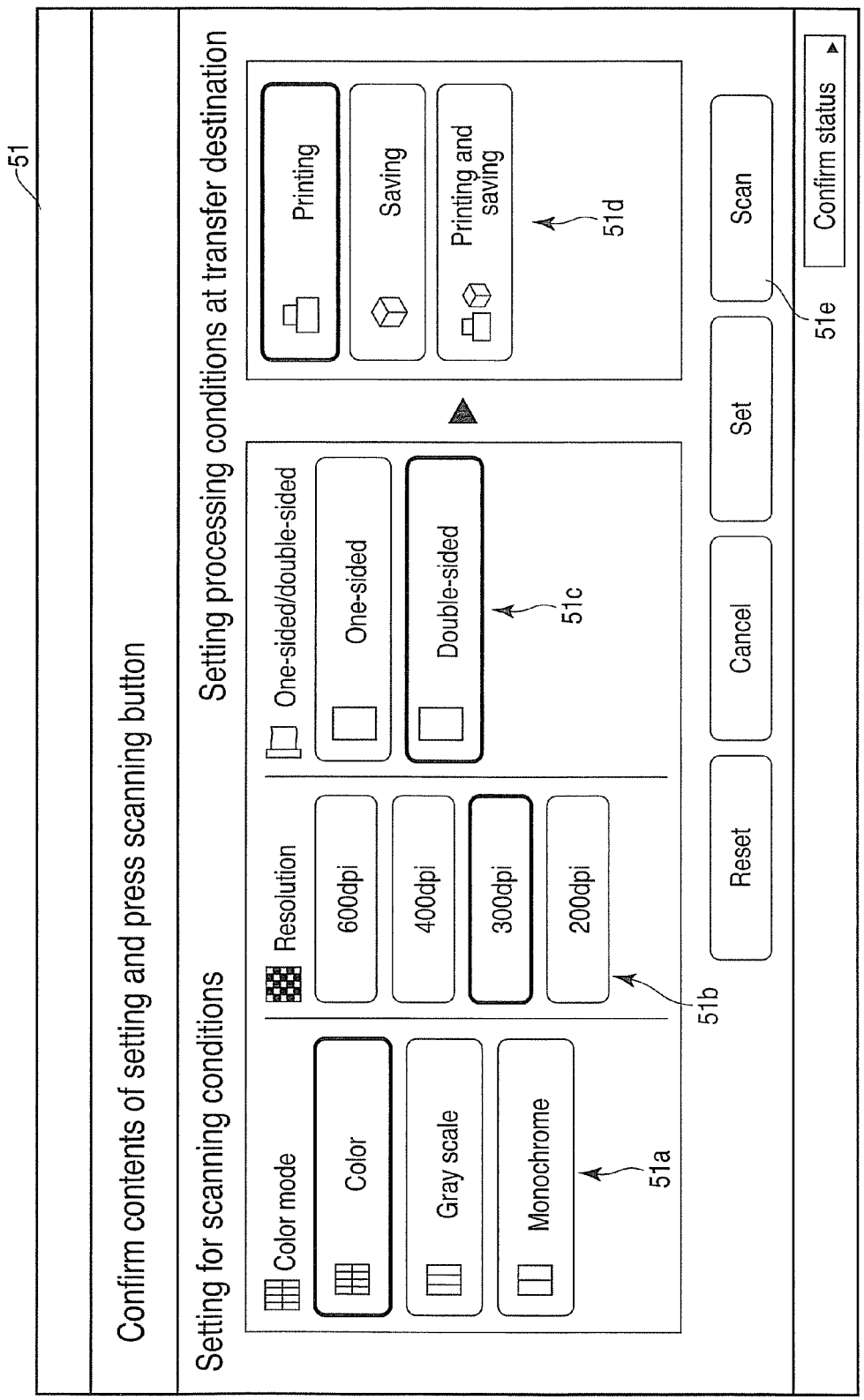
FIG. 7 is a diagram showing an example of the UI screen displayed by the MFP in FIG. 1.

FIG. 7 is a diagram showing an example of a UI screen 51 for scanning.

The UI screen 51 includes button groups 51a, 51b, 51c, and 51d and a button 51e.

The button group 51a includes three buttons in association with respective modes including "color", "gray scale", and "monochrome". The MFP 11 alternatively switches these three buttons to be active in response to the operation of the operator. The MFP 11 sets the mode in association with the active button to a mode to be applied to scanning. The example in FIG. 7 shows a state in which the "color" mode is in an active state.

The button group 51b includes four buttons in association with respective resolutions including "600 dpi", "400 dpi", "300 dpi", and "200 dpi". The MFP 11 alternatively switches these four buttons to be active in response to the operation of the operator. The MFP sets the resolution in association with the active button to the resolution to be applied to scanning. The example in FIG. 7 shows a state in which the scanning resolution is set to "300 dpi".

The button group 51c includes two buttons in association with respective modes including "one-side" and "double-sided". The MFP 11 alternatively switches these two buttons to be active in response to the operation of the operator. The MFP 11 sets the mode in association with the active button to a mode to be applied to scanning. The example in FIG. 7 shows a state in which the "double-sided" mode is in an active state.

The button group 51d includes three buttons in association with the respective contents of processing including "printing", "saving", and "printing and saving". The MFP 11 alternatively switches these three buttons to be active in response to the operation of the operator. The MFP 11 sets the content of processing in association with the active button to a content of processing at the transfer destination. The example in FIG. 7 shows a state in which "printing" is set as the content of processing at the transfer destination.

The MFP 11 scans the original document set in a scanner with a condition set by the button groups 51a, 51b, and 51c in response to the operation of the operator pressing the button 51e. Then, the MFP 11 saves the file acquired by scanning in a built-in memory along with the information indicating the content of processing set using the button group 51d.

The MFP 11 returns to a state for displaying the UI screen 41 after the start of the scanning or after the completion of the scanning.

The MFP 11 scans the original document for each operation of the operator pressing the button 51e and respectively saves the original document as a different file in the built-in memory.

The MFP 11 displays the UI screen for checking the file in accordance with the operation of the operator pressing the button 41c in the UI screen 41.

FIG. 8 is a diagram showing an example of a UI screen 61 for checking the file.

The UI screen 61 displays a list of various kinds of information regarding a file saved in the built-in memory of the MFP 11. The various kinds of information includes an icon indicating which mode is applied from among "color", "gray scale", and "monochrome", a file name, a number of pages, a file size, a scanning date, and a content of processing at the transfer destination. The content of processing at the transfer destination includes a check button 61a indicating whether or not "printing" was selected and a check button 61b indicating whether or not "saving" was selected. In addition, a check mark is added to the check button for the selected content of processing. The example in FIG. 8 shows that "saving" was selected for a first file on the list, "printing and saving" was selected for a second file, and "printing" was selected for a third file, respectively as the content of processing.

The MFP 11 turns on and off the setting represented by a clicked check button in response to the operation of the operator clicking the check buttons 61a and 61b. That is, if the first check button 61a on the list in the UI screen 61 in the state shown in FIG. 8 is clicked, for example, the MFP 11 updates the UI screen 61 so as to add a check mark to the check button and changes the content of processing for the first file on the list to "printing and saving".

The MFP 11 returns to a state of displaying the UI screen 41 in response to the operation of the operator pressing the button 61c.

The MFP 11 transfers to the adapter 1 the file saved in the built-in memory at that time along with the information indicating the transfer destination and the content of processing selected at that time in response to the operation of the operator pressing the button 41d in the UI screen 41.

The display of the UI screens 51, 61, and 71 can be implemented by transferring data indicating the respective screen by the adapter 1 to the MFP 11 in accordance with the necessity of display and by displaying the UI screen in accordance with the data received by the MFP 11. Alternatively, another configuration is also possible in which the adapter 1 collectively transfers the data indicating the respective UI screens to the MFP 11, the MFP 11 saves the data in an internal memory, and the MFP 11 changes the UI screen to be displayed.

Figure 9:
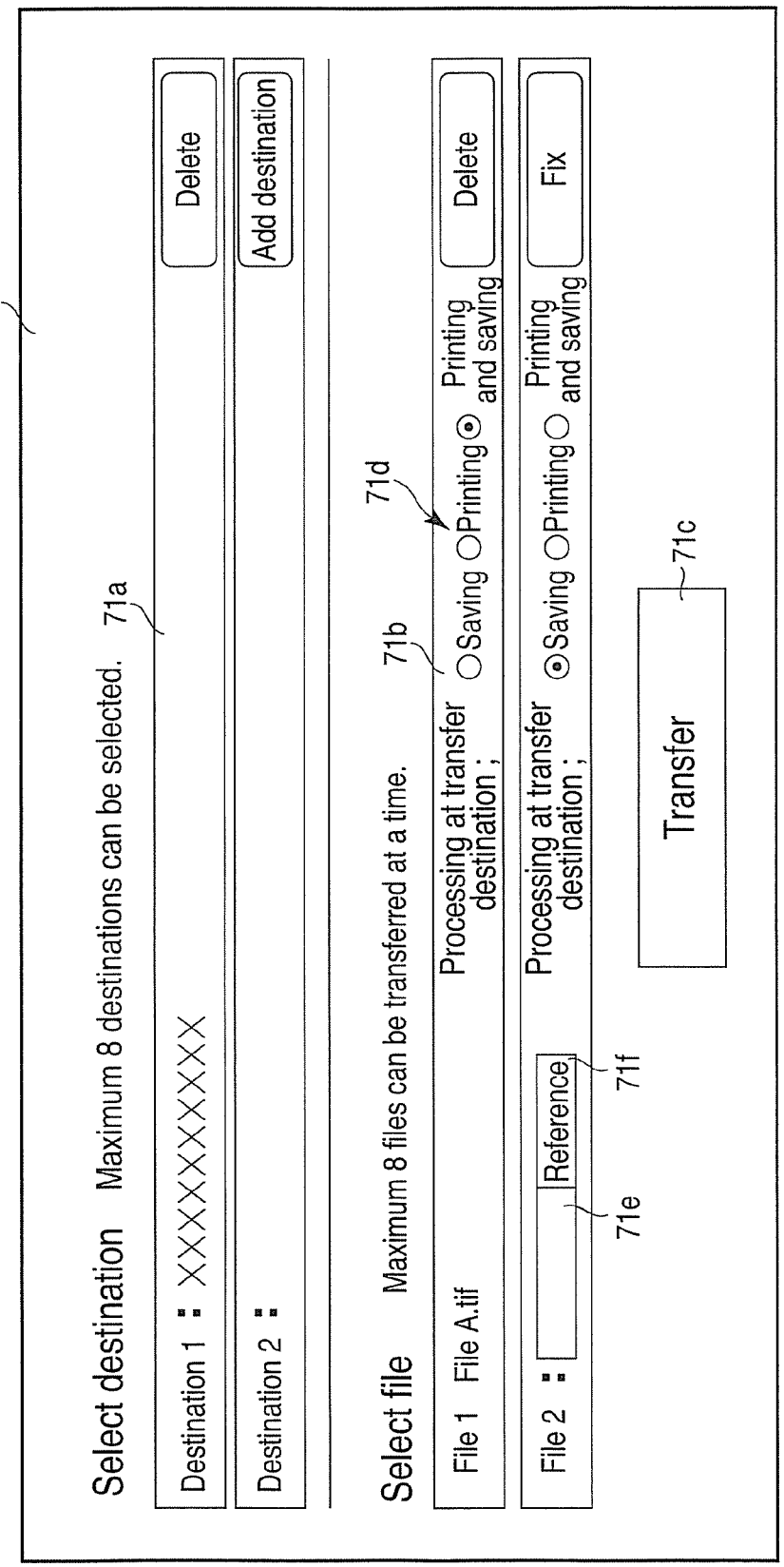
FIG. 9 is a diagram showing an example of the UI screen displayed by a computer in FIG. 1.

FIG. 9 is a diagram showing an example of a UI screen 71 displayed by the computer 14 in response to the inquiry information.

The UI screen 71 includes selecting sections 71a and 71b and a button 71c.

The selecting sections 71a are displayed, a number of which is greater by one than the number of transfer destinations already selected. The selecting sections 71a other than one selecting section are for displaying information relating to the transfer destinations which were already selected. It is possible to select the transfer destination at the computer 14 using the address book data stored in the storing device 1c of the adapter 1, the built-in memory of the computer 14, or the like in the same manner as in the case of MFP 11. The one selecting section 71a is an operation section for newly selecting a transfer destination.

The selecting sections 71b are displayed, a number of which is greater by one than the number of files already selected. The selecting sections 71b other than one selecting section are for displaying a file name already selected and a radio button 71d. The radio button 71d is for showing which one of "saving", "printing", and "printing and saving" was selected as the content of processing for the file at the transfer destination. The one selecting section 71b is an operation section for newly selecting a file. In the selecting section 71b as such an operation section, an input section 71e for a file name and a button 71f are displayed instead of the file name. The computer 14 determines the file name in response to the operation of the operator directly inputting the file name in the input section 71e. In addition, the computer 14 displays a screen for selecting a file saved inside or outside the computer 14 in response to the operation of the operator pressing the button 71f and determines the file name in response to the operation of the operator in the selecting screen.

The button 71c is for inputting a request for transferring a file.

The computer 14 transfers to the adapter 1 the file selected at that time in response to the operation of the operator pressing the button 71c in the UI screen 71 along with the setting information indicating the transfer destination and the content of processing selected at that time.

In Act Ac2, the controller 1d acquires the file and the setting information transferred from the terminal as described above and saves the file and the setting information in the storing device 1c.

In Act Ac3, the controller 1d generates transfer information including the file saved in the storing device 1c as described above and added information in accordance with the content of processing indicated by the setting information. If plural files are saved in the storing device 1c, the added information relating to each of the plural files is included in the transfer information. The added information is set in advance as individual information respectively relating to "saving", "printing", and "printing and saving".

In Act Ac4, the controller 1d transfers the transfer information to the NGN 25. Specifically, the controller 1d instructs the protocol processor 1b to transfer the transfer information to the address indicated by the setting information saved in the storing device 1c. The protocol processor 1b receives this instruction and then transfers the transfer information to the above address in accordance with the protocol such as RFC3261. At this time, the transfer information is transferred to the NGN 25 via the I/F 1a, the LAN 20, and the G/W 6.

The transfer information transferred to the NGN 25 by one of the adapters 2, 3, 4, and 5 or another adapter while the adapter 1 is set as a transfer destination is given to the adapter 1 via the G/W 6 and the LAN 20. In such a case, the controller 1d of the adapter 1 executes the processing shown in FIG. 10.

In Act Ad1, the controller 1d receives the transfer information via the I/F 1a and saves the transfer information in the storing device 1c.

In Act Ad2, the controller 1d confirms whether or not the transfer information includes added information. If the transfer information includes the added information, the controller 1d proceeds from Act Ad2 to Act Ad3.

In Act Ad3, the controller 1d selects one file which was not selected yet. If only one file is saved in the storing device 1c in Act Ad1, the one file is the file which was not selected yet. If plural files are saved in the storing device 1c in Act Ad1, the files which were not selected yet from among the plural files correspond to the files which were not selected yet. Hereinafter, the file selected here is referred to as a selected file.

In Act Ad4, the controller 1d determines the content of processing for the selected file based on the added information relating to the selected file.

In Act Ad5, the controller 1d confirms whether or not the determination result in Act Ad4 is "saving". If the content of processing for the selected file is set to "printing" or "printing and saving", the controller 1d makes a determination of NO in Act Ad5 and proceeds to Act Ad6.

In Act Ad6, the controller 1d confirms whether or not a print device for printing the selected file is registered. This can be implemented in the same processing as that in Act Ab5.

Then, if a print device is registered, the controller 1d proceeds from Act Ad6 to Act Ad7. In Act Ad7, the controller 1d requests the printing of the selected file to the above registered print device.

In Act Ad8, the controller 1d confirms whether or not the determination result in Act Ad4 is "printing and saving". Then, if the content of processing for the selected file is set to "printing", the controller 1d makes a determination of NO in Act Ad8 and proceeds to Act Ad9. In Act Ad9, the controller 1d deletes the selected file in the storing device 1c. Thereafter, the controller 1d proceeds to Act Ad10. In such a manner, the file for which the content of processing is set to "printing" is printed, deleted from the storing device 1c, and is not saved thereafter.

If the content of processing for the selected file is set to "saving", the controller 1d makes a determination of YES in Act Ad5 and proceeds to Act Ad10 without performing Act Ad6 to Act Ad9. In such a manner, the file for which the content of processing is set to "saving" is not printed but saved in the storing device 1c thereafter.

If the controller 1d determines in Act Ad6 that no print device is registered, the controller 1d proceeds from Act Ad6 to Act Ad10 without performing Act Ad7 to Act Ad9.

If the content of processing for the selected file is set to "printing and saving", the controller 1d makes a determination of YES in Act Ad8 and proceeds to Act Ad10 without performing Act Ad9. In such a manner, the file for which the content of processing is set to "printing and saving" is printed and saved in the storing device 1c thereafter.

In Act Ad10, the controller 1d confirms whether or not a file which was saved in the storing device 1c in Act Ad1 and was not selected yet is absent. If a file which was not selected yet is present, the controller 1d makes a determination of NO in Act Ad10 and returns to Act Ad3. In such a manner, the controller 1d repeats the above processing while setting another file as the selected file.

Figure 10:
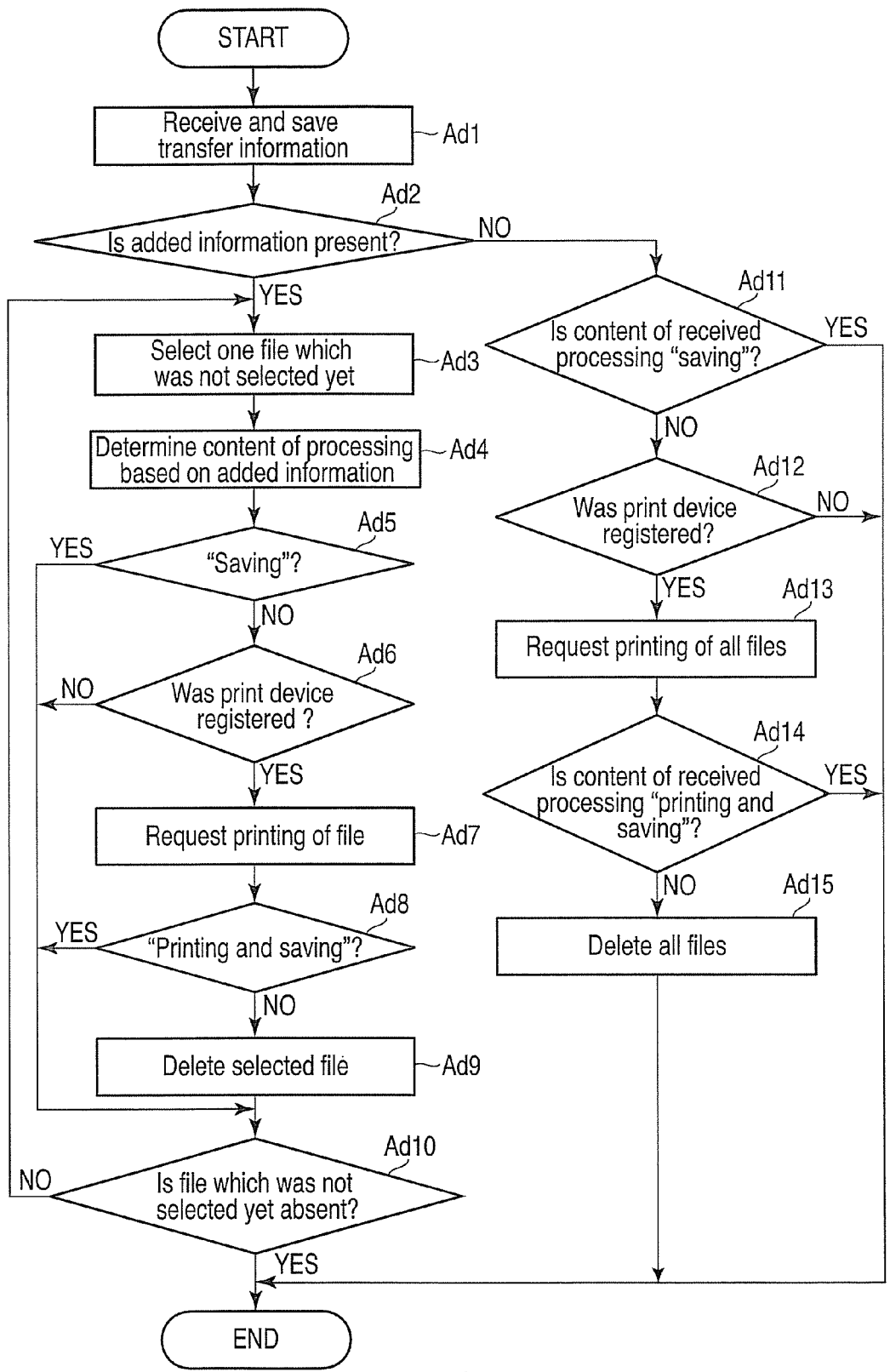
FIG. 10 is a flow chart of processing by the controller in FIG. 1 in the second operation example.

If the above processing is performed on all the files saved in the storing device 1c in Act Ad1, the controller 1d makes a determination of YES in Act Ad10 and completes the processing shown in FIG. 10.

If the transfer information does not include the added information, the controller 1d makes a determination of NO in Act Ad2. In such a case, the controller 1d proceeds from Act Ad2 to Act Ad11. In Act Ad11, the controller 1d confirms whether or not the content of received processing is "printing". In addition, the content of received processing is a content of processing for the file received by the adapter 1, and one of "printing", "saving" and "printing and saving" is preset by the user of the adapter 1. Then, the information indicating the content received of processing is stored in the storing device 1c.

If the content of received processing is "printing" or "printing and saving", the controller 1d makes a determination of NO in Act Ad11 and proceeds to Act Ad12. In Act Ad12, the controller 1d confirms whether or not a print device for printing the selected file is registered. This can be implemented by the same processing as in Act Ab5.

Then, if a print device is registered, the controller 1d proceeds from Act Ad12 to Act Ad13. In Act Ad13, the controller 1d requests printing of all the files included in the transfer information saved in the storing device 1c in Act Ad1 to the above registered print device. If the printing of all the files is completed, the controller 1d proceeds to Act Ad14.

In Act Ad14, the controller 1d confirms whether or not the content of received processing is "printing and saving". Then, the content received of processing is "printing", the controller 1d makes a determination of NO in Act Ad14 and proceeds to Act Ad15. In Act Ad15, the controller 1d deletes from the storing device 1c all the files included in the transfer information saved in the storing device 1c in Act Ad1. Thereafter, the controller 1d completes the processing shown in FIG. 10.

If the content of received processing is set to "saving", the controller 1d makes a determination of YES in Act Ad11 and completes the processing shown in FIG. 10 without performing Act Ad12 to Act Ad15.

If no print device is registered, the controller 1d makes a determination of NO in Act Ad12 and completes the processing shown in FIG. 10 without performing Act Ad13 to Act Ad15.

If the content of received processing is "printing and saving", the controller 1d makes a determination of YES in Act Ad14 and completes the processing shown in FIG. 10 without performing Act Ad14 and Act Ad15.

In such a manner, if the transfer information does not include the added information, and no instruction was made for the content of processing by the transfer source, the file is processed in accordance with the content of received processing.

This embodiment can be modified in various manners as follows.

In the first operation example, another configuration is also applicable in which third added information is prepared and the transfer destination is made to perform both "printing" and "saving" based on the third added information.

In the first operation example, the content of processing which can be controlled by the transfer source may include another content of processing such as transferring of the file to the terminal, for example, or may not include one or both of "printing" and "saving".

In the first operation example, a part of the first to fourth modes may be omitted for the determination mode.

In the second operation example, the content of processing which can be controlled by the transfer source may include another content of processing such as transferring of the file to the terminal, for example, or may not include one or all of "printing", "saving", and "printing and saving".

The function of the adapter 1 may be installed in the MFP or the computer. In addition, the function of the adapter 1 can be implemented as a device having both the functions of adapter 1 and the G/W.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a first communication control apparatus; and
a second communication control apparatus,
wherein the first communication control apparatus includes
an acquiring unit which acquires a computer file,
a generating unit which generates transfer information including the computer file and added information indicating a content of processing designated by a user of the first communication control apparatus from among plural contents of processing relating to the computer file, the plural contents of processing including a first content of processing which prints the computer file and deletes the computer file after the printing, a second content of processing which stores the computer file without printing and a third content of processing which prints the computer file and stores the computer file after the printing, and
a transferring unit which transfers the transfer information to the second communication control apparatus, and
wherein the second communication control apparatus includes
a receiving unit which receives the transfer information transferred by the transferring unit,
a storing device which stores the transfer information received by the receiving unit, and
a processing unit which performs processing on the computer file included in the stored transfer information when the added information included in the stored transfer information indicates the first content of processing to request a print device to print the computer file included in the stored transfer information and delete the computer file from the storing device after the printing, or when the added information included in the stored transfer information indicates the second content of processing to maintain the stored computer file without deleting the computer file, or when the added information included in the stored transfer information indicates the third content of processing to request a print device to print the computer file included in the stored transfer information and store the computer file as it is in the storing device.

2. A communication control apparatus comprising:
an acquiring unit which acquires a computer file,
a generating unit which generates transfer information including the computer file and added information indicating a content of processing designated by a user from among plural contents of processing relating to the computer file, the plural contents of processing including a first content of processing which prints the computer file and deletes the computer file after the printing, a second content of processing which stores the computer file without printing and a third content of processing which prints the computer file and stores the computer file after the printing, and
a transferring unit which transfers the transfer information to another communication control apparatus.

3. The apparatus according to claim 2,
wherein the acquiring unit acquires the computer file from a communication terminal.

4. The apparatus according to claim 3,
wherein the generating unit determines one content of processing from among the plural contents of processing in accordance with a notification from the communication terminal, and adds to the transfer information the added information indicating the content of processing.

5. The apparatus according to claim 3,
wherein the generating unit adds to the transfer information the added information notified by the communication terminal.

6. The apparatus according to claim 2,
wherein the generating unit adds to the transfer information the added information indicating the content of processing preset for the communication control apparatus as a transfer destination of the transfer information.

7. A communication control apparatus comprising:
a receiving unit which receives transfer information transferred by another communication control apparatus and including a computer file and added information indicating one of plural contents of processing;
a storing device which stores the transfer information received by the receiving unit, and
a processing unit which performs processing on the computer file included in the stored transfer information, when the added information included in the stored transfer information indicates a first content of processing to request a print device to print the computer file included in the stored transfer information and delete the computer file from the storing device, or when the added information included in the stored transfer information indicates a second content of processing to maintain the stored computer file without deleting the computer file, or when the added information included in the stored transfer information indicates the a content of processing to request a print device to print the computer file included in the stored transfer information and store the computer file as it is in the storing device.

8. The apparatus according to claim 7,
wherein the processing unit performs processing on the computer file in accordance with a preset content of processing if the transfer information received by the receiving unit does not include the added information.

9. A communication method with which communication is made between a first communication control apparatus and a second communication control apparatus comprising:

acquiring a computer file by the first communication control apparatus;

generating by the first communication control apparatus transfer information including both the computer file and added information indicating content of processing designated by a user of the first communication control apparatus from among plural contents of processing relating to the computer file, the plural contents of processing including a first content of processing which prints the computer file and deletes the computer file after the printing, a second content of processing which stores the computer file without printing and a third content of processing which prints the computer file and stores the computer file after the printing, transferring the transfer information from the first communication control apparatus to the second communication control apparatus, receiving by the second communication control apparatus the transfer information transferred by the first communication control apparatus, storing by the second communication control apparatus the received transfer information, and processing by the second communication control apparatus the computer file included in the stored transfer information when the added information included in the stored transfer information indicates the first content of processing to request a print device to print the computer file included in the stored transfer information and delete the computer file from the storing device after the printing, or when the added information included in the stored transfer information indicates the second content of processing to maintain the stored computer file without deleting the computer file, or when the added information included in the stored transfer information indicates the third content of processing to request a print device to print the computer file included in the stored transfer information and store the computer file as it is in the storing device.

\* \* \* \* \*